Figure 1:
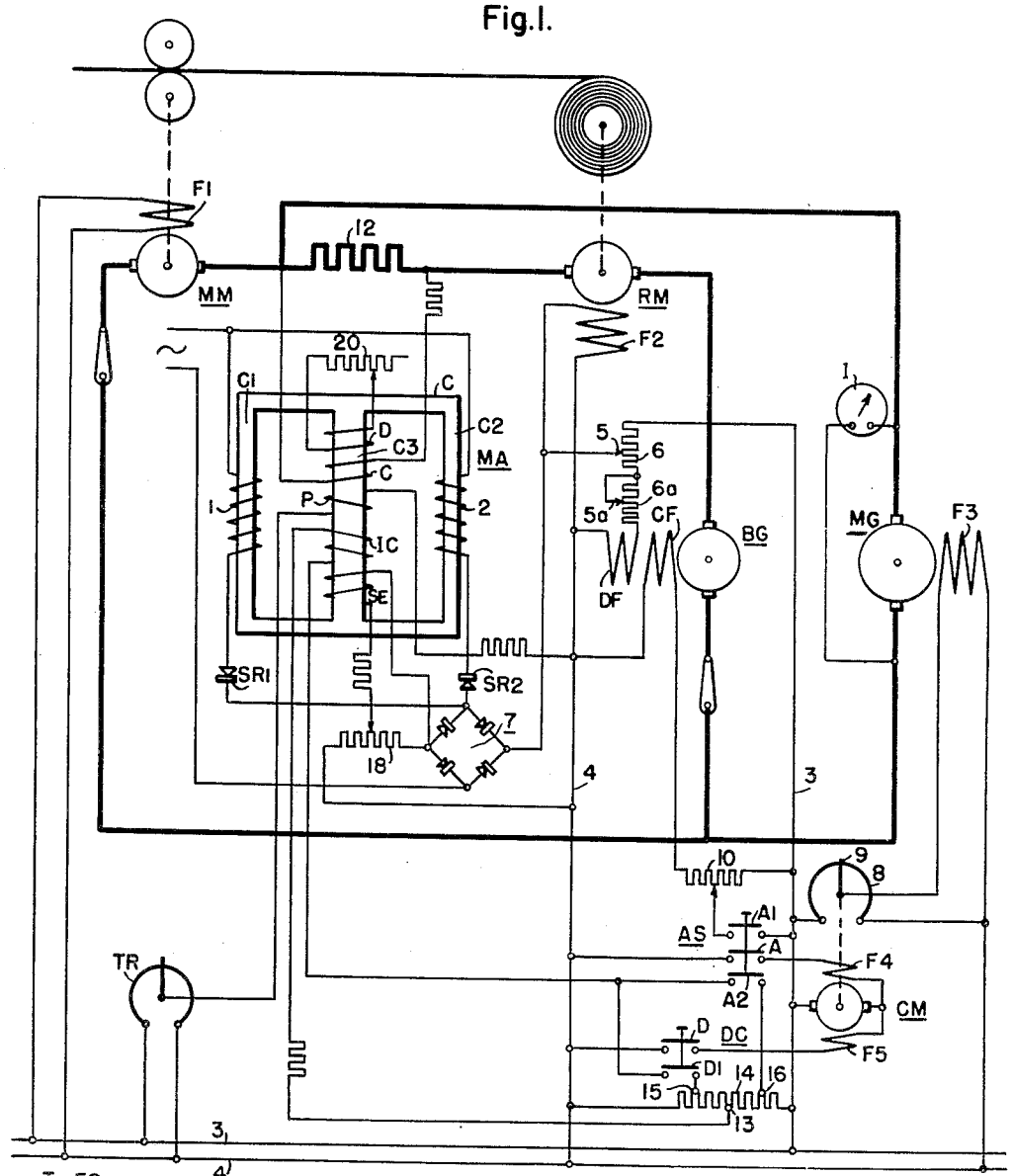

April 26, 1955     E. F. ALLBERT     2,707,253

CONTROL SYSTEM FOR REEL MOTOR

Filed June 29, 1953

INVENTOR
Eugene F. Allbert.
BY
Paul E. Friedemann
ATTORNEY

United States Patent Office 2,707,253
Patented Apr. 26, 1955

2,707,253

CONTROL SYSTEM FOR REEL MOTOR

Eugene F. Allbert, Buffalo, N. Y., assignor to Westinghouse Electric Corporation, East Pittsburgh, Pa., a corporation of Pennsylvania Application June 29, 1953, Serial No. 364,611

8 Claims. (Cl. 318—6)

This invention relates generally to control systems and more in particular to control systems adapted for controlling motors.

In the application of motors to winding reel drives in paper mills, wire mills, steel mills, etc. and with particular reference to steel mills, it is necessary that the reel motor be controlled in such manner as to maintain a predetermined tension in the strand or web of material between the winding reel and the last stand of the mill. This is usually accomplished by utilizing the reel motor armature current as the cue for controlling the reel motor.

The present invention is directed particularly to an arrangement affording improvements in the control of the reel motor as will be apparent hereinafter.

One object of this invention is to provide a system of control for a motor which is simple with respect to operational requirements and positive in operation.

Another object of this invention is to provide a control for a motor which utilizes a static type of regulator for detecting and for controlling the motor condition which is to be controlled.

In a more specific sense, it is an object of this invention to provide a control system for a motor driving a wind-up reel in which provision is made for compensating the inertia of the wind-up reel during accelerating and decelerating intervals of operation.

More specifically stated with reference to another aspect of this invention, it is an object of this invention to provide a control for a motor driving a wind-up reel in which a booster generator connected in series with the reel motor is utilized to control motor current, the booster generator being provided with a cumulative field winding, the excitation of which is varied during periods of acceleration and being further provided with a differential field winding excited in parallel with a field winding of the reel motor by means of a regulator controlled, in part, in dependence of motor current.

In another of its aspects, it is an object of this invention to provide a system of the character referred to wherein a magnetic amplifier is utilized as the regulating element and in which provision is made for increasing the sensitivity of the magnetic amplifier.

More specifically stated, it is an object of this invention to improve the performance characteristics or response characteristics of a magnetic amplifier by imparting a degree of self-excitation thereto in dependence of the output of the amplifier.

Figure 3:
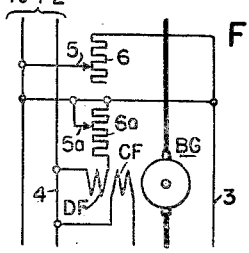
Figure 2:
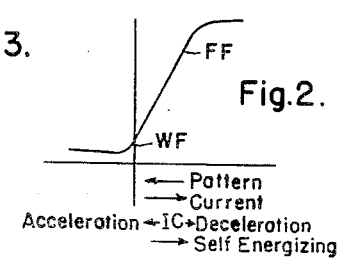

The foregoing statements are merely illustrative of the various aims and objects of this invention. Other objects and advantages will become apparent from a study of the following disclosure in conjunction with the accompanying drawing, in which:

Figure 1 is a diagrammatic illustration of a motor control arrangement embodying the principles of this invention;

Fig. 2 graphically illustrates the characteristics of the magnetic amplifier utilized in the system; and Fig. 3 illustrates a modification of the circuit of Fig. 1.

The arrangement illustrated in Fig. 1 is particularly adapted for controlling a reel motor, such as RM, utilized in driving a wind-up reel on which the strip coming from the last station of a strip mill is wound. It will be appreciated, however, by those skilled in the art that this invention is not limited to such an application but that the general principles herein set forth are applicable, for instance in paper mill drives where tension control is a matter of considerable importance as well as in other arrangements wherein a strip of material is to be wound.

The system provides simultaneous speed regulation by armature voltage control for a mill motor MM which drives the last stand of the mill and a reel motor RM driving the reel on which the material coming from the last stand is wound. This is accomplished by connecting the armature winding of the mill motor and the reel motor in parallel across the armature winding of a main generator MG, so that variation in the armature winding voltage of the main generator is simultaneously reflected in voltage variations across the armature windings of the respective motors, to effect simultaneous changes in motor speed.

Motor MM is provided with a field F1 which is excited from a supply of direct current represented in conductors 3 and 4. Motor RM is provided with a single field winding designated F2 which is provided with a base excitation from the supply conductors 3 and 4, depending upon the setting of a tap 5 on an adjustable resistor 6 and controlled as to degree of excitation by means of a magnetic amplifier MA having its output circuit, represented in load rectifier 7, connected across the field winding F2. The main generator MG is provided with a field winding F3, the excitation of which is controlled by a rheostat 8 having an adjustable tap 9. This rheostat connects the field winding F3 across the supply conductors 3 and 4. Rheostat 8 is controlled by a split field control motor, generally designated CM, having a forward field winding F4 and a reverse field winding F5. The motor CM is a series type direct-current motor and the series circuits involving the fields F4 and F5 are selectively connected across supply conductors 3 and 4 by an accelerating contactor or switch AS and a decelerating switch DC. As shown, these switches may be of the push-button type adapted for manual operation.

In addition to the control of motor RM by the control of its field F2 and by the control of its armature voltage by the main generator MG, a booster generator is utilized in the system. This booster generator is designated BG and its armature winding is connected in series with the armature winding of the motor RM across the output terminals of the main generator MG. The booster generator is provided with a pair of field windings designated CF and DF.

Cumulative field CF is connected in series with an adjustable tap resistor 10 across the supply conductors 3 and 4. A portion of this resistor is shunted by contacts A1 on the accelerating switch AS so that at the time this switch is closed to effect operation of control motor CM to change the excitation of the generator field F3 to accelerate the mill, a portion of the resistor 10 is shunted to recalibrate the cumulative field CF of the booster generator. The purpose of this will be described hereinafter.

The other field of the booster generator is designated DF and is a differential field winding. This field winding is connected in series with the adjustable resistor 6 across the supply conductors 3 and 4 and is provided with base excitation dependent upon the ohmic value of the adjustable resistor 6. The field is also arranged in parallel with the field F2 of the reel motor across the output of the load rectifier 7 of the magnetic amplifier and consequently the degree of differential excitation is controlled in dependence of the output of the magnetic amplifier simultaneously with the degree of excitation of the field F2 of the reel motor.

The magnetic amplifier MA is the parallel connected doubler type illustrated herein as comprising a three-legged core C having respective main winding core legs C1 and C2 and a control winding core leg designated C3. The main windings 1 and 2, which are disposed on respective core legs C1 and C2, are connected in parallel circuits including in series therein respective self-saturating rectifiers SR1 and SR2 which are oppositely poled in the parallel branches. Thus, for example, on one half cycle of the alternating supply current the rectifier SR1 is properly poled to conduct current and the parallel branch, including the main winding 1, therefore passes current on the said one half cycle. On the other half cycle, the rectifier SR2 is properly poled for the instant polarity of alternating current and consequently that branch conducts. The main windings are so wound that the flux produced thereby is unidirectional through the center core leg or control winding leg C3. The parallel connected main winding circuits are connected in series with the input terminals of the load rectifier 7 across the indicated supply of alternating current.

The magnetic amplifier is controlled by a plurality of control windings. These are a pattern winding P, a current winding C, a damping winding D, an inertia compensation winding IC and a self-energizing winding SE. Self-energizing, in the sense used here, implies excitation from the output of the magnetic amplifier.

The pattern winding P is controlled by means of a tension rheostat TR, the setting of which determines the tension in the strip of material being wound. This rheostat connects the pattern winding across supply conductors 3 and 4. The flux produced in the core by the pattern winding opposes the flux produced by the main windings 1 and 2 and hence tends to desaturate the core. As will be seen by reference to Fig. 2, this tends to drive the magnetic amplifier towards its minimum output condition whereby the field F2 of the reel motor is weakened.

The current winding C of the magnetic amplifier is connected across a load current resistor 12 disposed in series in the armature circuit of the reel motor. This resistor, therefore, has a voltage drop thereacross which is proportional to the load current of the reel motor. As will be seen from the magnetic amplifier characteristic of Fig. 2, in which the approximate full field and weak field conditions FF and WF, respectively, are indicated, the current winding is differential with respect to the pattern winding producing a flux in the core acting in the same direction as the main winding flux. Consequently, the current winding drives the magnetic amplifier towards saturation tending to increase its output and consequently driving the excitation of the field F2 towards the full field excitation condition.

The inertia compensating winding IC is reversible in excitation. This is accomplished by connecting one end of the winding to a center tap 13 on a resistor 14 and selectively connecting the other terminal of the winding to points 15 and 16 on this resistor, depending upon which of contacts A2 and D1 on the accelerating and decelerating switches, respectively, is closed. The resistor 14 is connected across the supply conductors 3 and 4. The effect of the inertia compensating winding, as will be seen by reference to Fig. 2, during acceleration is to desaturate the core of the magnetic amplifier and during deceleration to drive the core further towards saturation to respectively tend to decrease and to increase the output of the magnetic amplifier under the named conditions.

The self-energizing field winding SE is connected across a tapped portion of a load resistor 18 which is connected in series in the output circuit of the load rectifier 7. Thus this field winding is energized in dependence of the output of the magnetic amplifier. The flux produced by this self-energizing field acts cumulatively with the flux produced by the main windings and, therefore, as seen in Fig. 2, tends to aid in saturating the core. The advantage of using a field winding, such as he self-energizing winding, is that the behavior or the performance of the amplifier may be improved in the sense that the sensitivity of the amplifier is effectively increased, depending upon the degree of saturation produced by this self-excitation. This will be appreciated when it is observed that, depending upon the level of the output, a degree of core magnetization due to self-excitation exists. This tends to increase the slope of the saturation curve and the slope of the curve may be caused to approach the characteristic achievable with some of the square looped hysteresis materials used in such cores, but with less expensive core materials, the characteristics of which are not as steep.

The damping winding D, as its name implies, produces a flux in opposition to the flux of the main windings. This winding is inductively energized by flux linkage with the core and the damping winding circuit is closed across a calibrating resistor 20 which controls the degree of damping winding action.

This invention will be better understood upon brief reference to the physical aspects of the problem of tension control in an arrangement such as herein described. Neglecting friction and other losses, the torque T which the reel must develop to maintain a predetermined tension $t$ in the strip must equal $$t \times \frac{d}{2}$$

where $d$ is the diameter of the coil of the strip wound on the reel. Expressed electrically, the torque $T = k\phi I$, where $k$ is a constant, $\phi$ is a field flux and $I$ is the armature current. Hence the tension of the strip may be maintained by regulating the armature current $I$.

The armature current $I$ is dependent upon the differential between the line voltage E and the counterelectromotive force C. E. M. F. This may be seen from the relation $E - IR = $ C. E. M. F. The counterelectromotive force is expressable as equal to $\phi \times$ R. P. M. $\times k'$, where R. P. M. is the revolutions per minute and $k'$ is a proportionality constant.

From this, it will be seen that for a given speed of the reel motor the armature current may be controlled by controlling the reel motor field current which varies $\phi$ and hence varies the counterelectromotive force. This, in turn, determines $I$.

As the diameter of the coil on the reel increases, the speed of the motor necessarily decreases since the linear speed of the strip is controlled by the rate at which it comes out of the last roll stand, but as the speed of the reel motor decreases its counterelectromotive force also decreases. This means that the field flux $\phi$ must be increased to restore the desired value of armature current $I$ if the tension is to be maintained. The new product of $k\phi I$ will be greater in proportion to the coil diameter tending to maintain the tension substantially constant as the diameter $d$ of the coil increases.

When the reel motor is stalled and its speed is zero, the counterelectromotive force of the reel motor armature is zero. In the system shown, the armature current $I$ is determined by the equation $IR = E + V_B$, where $V_B$ is the output voltage of the booster generator. By regulating the differential field current of the booster generator when the reel is stalled, the armature current $I$ and the reel motor torque T may be regulated.

From the foregoing considerations, the following operation may be construed. Assuming that the mill has been jogged or otherwise suitably operated so that the strip may be passed therethrough and the winding operation begun on the reel, the accelerating pushbutton AS is depressed. This closes all of the contacts A1, A2 and A on the accelerating pushbutton. The contacts A1 short a portion of resistor 10 to introduce a given excitation to the field CF of the booster generator. The contacts A2 complete the circuit for differentially exciting the inertia compensating winding IC of the magnetic amplifier and the contacts A establish the energizing circuit for the motor CM which increases the excitation of the generator field F3. The accelerating switch is held closed until the desired speed setting is reached, at which time the accelerating switch is released to interrupt the control motor circuit and stop the rheostat. The ultimate speed which the mill will reach is thus established and both the mill motor and the roll motor RM are simultaneously controlled as to speed. The function of the booster generator in the presence of the increased cumulative excitation of the field CF is that of forcing the reel motor RM to aid in accelerating the mass of the roll during the accelerating period. The current winding C under this condition performs its normal function producing a saturating core flux tending to increase the output of the magnetic amplifier and consequently tending to strengthen the motor field F2. This is the normal function which tends to limit the motor armature current to the value determined by the setting of the tension rheostat TR which controls the excitation of the pattern winding P. However, during this accelerating interval, the torque on the reel motor is made up of two components, one due to strip tension and one due to angular acceleration of the mass of the reel, neglecting friction or other losses. The inertia compensating winding, therefore, is provided for the purpose of recalibrating this system to permit higher currents during accelerating intervals, and this is accomplished by introducing a degree of desaturation control by the inertia compensating winding in the magnetic amplifier. This recalibration control is removed at the time the accelerating switch AS is released and such release can be determined by the operator through observation of an instrument, such as I, which is connected across the terminals of the main generator armature winding and which may be calibrated in terms of R. P. M. or, if desired, linear speed of the strip, whichever is convenient. Thus during this interval, the excitations of the reel motor field winding F2 and of the differential field winding DF of the booster generator are maintained at optimum values to provide the increased temporary level of armature current and hence acceleration rate while maintaining the proper strip tension.

If at the time the system is operating at the established speed the strip tension increases, the reel motor armature current correspondingly increases, and the voltage across resistor 12 in series in the armature circuit of the reel motor increases. The excitation of the current winding C of the magnetic amplifier now increases proportionally and tends to override the pattern excitation in sufficient degree to increase the excitation of the reel motor field winding F2 in the amount required to hold the motor armature current constant. When the speed of the reel motor decreases, the counterelectromotive force of the reel motor armature winding also decreases. Thus, as described above, the effect of increasing the excitation of the field winding F2 is that of increasing the counterelectromotive force of the reel motor armature. However, the effect of the booster generator armature voltage is reflected in the system and consequently by the control of this generator, since its armature winding is in series with the reel motor armature winding, also affects the load current. In the present arrangement, the differential field of the booster generator is controlled simultaneously with the field F2 of the reel motor. Thus, under the assumed condition, in view of the parallel connection of the field DF with the field F2, the differential excitation is increased, reducing the series aiding armature voltage of the booster generator which reduces the armature current.

In a presently preferred arrangement the booster generator is utilized only for compensating IR losses and is therefore adjusted so that when contacts A1 are open the booster generator supplies 100% of the IR drop of the circuit. Therefore, the change in booster generator output due to field DF during coil build upon the reel will not be appreciable in most cases and will not adversely affect the winding operation. This change in booster generator output, however, does cause a small tension error, but the error is in a direction to produce better coils.

To slow the system down, the decelerating push button DC is pressed. This closes the contacts D which reverses the control motor CM driving the rheostat 8 to a position decreasing the excitation of the main generator field winding F3. At the same time, the contacts D1 of the decelerating push button are closed. This energizes the inertia compensating winding IC in a sense opposite to that for acceleration, producing an inertia compensating flux in the core tending to drive the magnetic amplifier further into saturation. This increases the output of the magnetic amplifier and reduces the current limit level of the control in an amount corresponding to the decelerating component of motor torque due to reel inertia. Thus the actual current level is reduced in the amount required to compensate the system for reel inertia so that the current cue remains an approximately accurate indication of strip tension.

Stalled tension for inspection of the strip or mill for locking the strip in the jaws of a clamp type reel, or for other purposes, can be obtained in the present arrangement by dropping the main generator armature voltage through control of its field excitation at the decelerating push button to such a low value that the mill will not run. Under these conditions, the entire ohmic value of the adjustable resistor 10 is in series with the cumulative field winding CF of the booster generator and consequently its effect is practically negligible. The energization of the differential field winding DF under these conditions is the controlling factor.

The value of stalled tension to be maintained under these conditions will also be determined by the setting of the rheostat TR. The output voltage of the magnetic amplifier determines the field current through the reel motor field winding. Under this condition of stalled tension, the energization of the field winding F2, however, will not remain in direct proportion to the coil diameter since the armature winding of the reel motor is not rotating. If the tension in the strip exceeds the predetermined value, the current in the armature circuit of the reel motor increases the output of the magnetic amplifier, as described hereinbefore, which increases the excitation of the field winding F2. At the same time, the differential excitation of the booster generator is increased, which tends to reduce the current circulated through the armature of the reel motor by the booster generator. The decrease in armature current will be much greater proportionately than the increase in reel motor field current. Accordingly, the torque of the reel motor is reduced to the predetermined value which may be controlled by adjusting the setting of the tension rheostat TR.

Adjustment of tap 5 on resistor 6 may be used only for setting the weak field value of excitation of reel motor field F2 if desired and a separate adjustable resistor 6a, having a tap 5a, in series in the circuit of differential field DF used to independently control the excitation of this latter field. In applications where this is permissable, the range of motor speed may be extended to provide for larger coils, by adjusting the tap 5a to strengthen the differential excitation of the booster generator. The component of booster generator output due to the differential excitation is therefore increased to increasingly buck the line voltage. Such a special case correction, if left in, would, of course, change the tension over a greater range. This may not be acceptable in some cases. But in any case this type of adjustment could be used to wind some excessive footage of strip which would otherwise require a separate reel. As a further alternative in accomplishing this end, the arrangements of Fig. 3 may be used, in which, the resistors 6 and 6a are in parallel rather than in series as in Fig. 1. This effectively isolates the fields in that adjustment of one resistor is not reflected in the circuit of the other field, giving greater independence of control of the individual field circuits. Otherwise these circuits are the same.

From the foregoing, it is apparent that by means of a simple static regulator an effective control of strip tension is realized. However, it will be appreciated by those skilled in the art that other arrangements embodying equivalent details and equivalent organization of such details may be achieved without departing from the spirit and scope of this invention. Accordingly, it is intended that the foregoing disclosure and the showings made in the accompanying drawing shall be considered only as illustrative of the principles of this invention and not interpreted in a limiting sense.

I claim as my invention:

1. In a control for a motor, the combination of, a motor having an armature winding adapted for connection to a supply of electrical energy and having a motor field winding, a generator having an armature winding connected in series with the motor armature winding and having a cumulative generator field winding and a differential generator field winding, circuit connections for applying electrical energy to said cumulative generator field winding, a regulating device having an output circuit connecting said motor field winding and said differential generator field winding in parallel to effect energization thereof simultaneously and having an input circuit, and circuit means connected with said armature winding of said motor and said input circuit for energizing said input circuit in dependence of motor current.

2. In a control for a motor, the combination of, a motor having a motor armature winding and a motor field winding, a booster generator having an armature winding, a cumulative field winding and a differential field winding; a main generator having an armature winding and a field winding, a circuit connecting the booster generator armature winding in series with the motor armature winding across the main generator armature winding, a regulating device having an output circuit connecting said motor field winding and said differential field winding in parallel and having an input circuit, circuit means connected with the motor armature winding and said input circuit for energizing said input circuit in dependence of motor current, impedance means connecting said cumulative field winding to a supply of electrical energy, a variable impedance device connecting said field winding of said main generator to a supply of electrical energy, said variable impedance device having a movable element for varying the impedance thereof, a control motor for driving said movable element, and contact means operable in one position to shunt at least a portion of said impedance means and to connect said control motor to a supply of electrical energy to effect operation of said movable element of said variable impedance device.

3. In a control for a motor, the combination of, a motor having a motor armature winding and a motor field winding, a booster generator having an armature winding, a cumulative field winding and a differential field winding; a main generator having an armature winding and a field winding, a circuit connecting the booster generator armature winding in series with the motor armature winding across the main generator armature winding, a regulating device having an output circuit connecting said motor field winding and said differential field winding in parallel and having a pair of input circuits, circuit means connected with the motor armature winding and one of said input circuits for energizing said one input circuit in dependence of motor armature current, impedance means, normally open contact means connecting the other of said input circuits to said impedance means, impedance means connecting said cumulative field winding to a supply of electrical energy, normally open contact means connected across at least a portion of said last-named impedance means, a variable impedance device connecting said field winding of said main generator to a supply of electrical energy, said variable impedance device having a movable element for varying the impedance thereof, a control motor connected to drive said movable element, normally open contact means connecting said control motor to a supply of electrical energy, and means for closing all said contact means substantially simultaneously.

4. In a control for a motor, the combination of, a motor having a motor armature winding and a motor field winding, a booster generator having an armature winding, a cumulative field winding and a differential field winding; a main generator having an armature winding and a field winding, a circuit connecting the booster generator armature winding in series with the motor armature winding across the main generator armature winding, a magnetic amplifier having a main winding circuit adapted for connection to a supply of alternating current and having a control winding circuit, said differential field winding of said booster generator and said motor field winding being connected in parallel across said main winding circuit, circuit means connected with the motor armature winding and said control winding circuit for energizing said control winding circuit in dependence of motor current, impedance means connecting said cumulative field winding of said booster generator to a supply of electrical energy, a variable impedance device connecting said field winding of said main generator to a supply of electrical energy, said variable impedance device having a movable element for varying the impedance thereof, a control motor for driving said movable element, and contact means operable in one position to shunt at least a portion of said impedance means and to connect said control motor to a supply of electrical energy to effect operation of said movable element of said variable impedance device.

5. In a control for a motor, the combination of, a motor having a motor armature winding and a motor field winding, a booster generator having an armature winding, a cumulative field winding and a differential field winding; a main generator having an armature winding and a field winding, a circuit connecting the booster generator armature winding in series with the motor armature winding across the main generator armature winding, a magnetic amplifier having a main winding circuit adapted for connection to a supply of alternating current, a control winding circuit and a self-energizing winding circuit; said differential field winding of said booster generator and said motor field winding being connected in parallel across said main winding circuit, circuit means connected with the motor armature winding and said control winding circuit for energizing said control winding circuit in dependence of motor current, circuit means connecting said self-energizing winding circuit of said magnetic amplifier with the main winding circuit of said magnetic amplifier to cause energization of said self-energizing winding circuit in dependence of the output of said magnetic amplifier, impedance means connecting said cumulative field winding of said booster generator to a supply of electrical energy, a variable impedance element connecting said field winding of said main generator to a supply of electrical energy, a variable impedance element connecting said field winding of said main generator to a supply of electrical energy, said variable impedance device having a movable element for varying the impedance thereof, a control motor for driving said movable element, and contact means operable in one position to shunt at least a portion of said impedance means and to connect said control motor to a supply of electrical energy to effect operation of said movable element of said variable impedance device.

6. In a control for a motor, the combination of, a motor having a motor armature winding and a motor field winding, a booster generator having an armature winding; a cumulative field winding and a differential field winding; a main generator having an armature winding and a field winding, a circuit connecting the booster generator armature winding in series with the motor armature winding across the main generator armature winding, a magnetic amplifier having a main winding circuit adapted for connection to a supply of alternating current, an electrically closed anti-hunt winding circuit and a self-energizing winding circuit; said differential field winding of said booster generator and said motor field winding being connected in parallel across said main winding circuit, circuit means connected with the motor armature winding and said control winding circuit for energizing said control winding circuit in dependence of motor current, circuit means connecting said self-energizing winding circuit of said magnetic amplifier with the main winding circuit of said magnetic amplifier to cause energization of said self-energizing winding circuit in dependence of the output of said magnetic amplifier, impedance means connecting said cumulative field winding of said booster generator to a supply of electrical energy, a variable impedance element connecting said field winding of said main generator to a supply of electrical energy, said variable impedance device having a movable element for varying the impedance thereof, a control motor for driving said movable element, and contact means operable in one position to shunt at least a portion of said impedance means and to connect said control motor to a supply of electrical energy to effect operation of said movable element of said variable impedance device.

7. In a control for a motor, the combination of, a motor having a motor armature winding and a motor field winding, a booster generator having an armature winding, a cumulative field winding and a differential field winding; a main generator having an armature winding and a field winding, a circuit connecting the booster generator armature winding in series with the motor armature winding across the main generator armature winding, a magnetic amplifier having a main winding circuit adapted for connection to a supply of alternating current, a control winding, a self-energizing winding, a pattern winding and an inertia compensating winding; said differential field winding of said booster generator and said motor field winding being connected in parallel across said main winding circuit, circuit means for applying adjustable magnitudes of electrical energy to said pattern winding, circuit means connected with the motor armature winding and said control winding circuit for energizing said control winding circuit in dependence of motor armature current, circuit means connecting said self-energizing winding to said main winding circuit to energize said self-energizing winding in dependence of the output of said magnetic amplifier, first impedance means connecting said inertia compensating winding to a supply of electrical energy, second impedance means connecting said cumulative field winding of said booster generator to a supply of electrical energy, first normally open contact means connected across at least a portion of said first impedance means, second normally open contact means connected across at least a portion of said second impedance means, a variable impedance device connecting said field winding of said main generator to a supply of electrical energy, said variable impedance device having a movable element for varying the impedance of said variable impedance device, a control motor connected to drive said movable element, third normally open contact means connecting said motor to a supply of electrical energy, and means for substantially simultaneously closing said first, second and third contact means.

8. In a control for a motor, the combination of, a motor having a motor armature winding and a motor field winding, a booster generator having an armature winding, a cumulative field winding and a differential field winding; a main generator having an armature winding and a field winding, a circuit connecting the booster generator armature winding in series with the motor armature winding across the main generator armature winding, a magnetic amplifier having a main winding circuit adapted for connection to a supply of alternating current, a control winding, a self-energizing winding, an electrically closed anti-hunt winding circuit, a pattern winding and an inertia compensating winding; said differential field winding of said booster generator and said motor field winding being connected in parallel across said main winding circuit, circuit means for applying adjustable magnitudes of electrical energy to said pattern winding, circuit means connected with the motor armature winding and said control winding circuit for energizing said control winding circuit in dependence of motor armature current, circuit means connecting said self-energizing winding to said main winding circuit to energize said self-energizing winding in dependence of the output of said magnetic amplifier, first impedance means connecting said inertia compensating winding to a supply of electrical energy, second impedance means connecting said cumulative field winding of said booster generator to a supply of electrical energy, first normally open contact means connected across at least a portion of said first impedance means, second normally open contact means connected across at least a portion of said second impedance means, a variable impedance device connecting said field winding of said main generator to a supply of electrical energy, said variable impedance device having a movable element for varying the impedance of said variable impedance device, a control motor connected to drive said movable element, third normally open contact means connecting said motor to a supply of electrical energy, and means for substantially simultaneously closing said first, second and third contact means.

References Cited in the file of this patent

UNITED STATES PATENTS

| | | |
|---|---|---|
| 2,414,936 | Edwards et al. | Jan. 28, 1947 |
| 2,518,865 | Cartotto | Aug. 15, 1950 |